United States Patent Office 3,534,096
Patented Oct. 13, 1970

3,534,096
DIARYLSULFAMYL FLUORIDES AND TETRAARYLSULFAMIDES
John H. Pearson, Glen Rock, N.J., and Cecil C. Chappelow, Jr., Kansas City, Mo., assignors to Allied Chemical Corporation, New York, N.Y., a corporation of New York
No Drawing. Original application Feb. 11, 1964, Ser. No. 343,938, now Patent No. 3,336,382, dated Aug. 15, 1967. Divided and this application Aug. 14, 1967, Ser. No. 664,595
Int. Cl. C07c *143/70*
U.S. Cl. 260—543  6 Claims

ABSTRACT OF THE DISCLOSURE

Novel diarylsulfamyl fluoride type compounds and method for the preparation thereof which comprises reacting a compound having the formula ArAr'NM, wherein Ar and Ar' are selected from the group consisting of aryl and substituted aryl radicals and M is an alkali metal or a magnesium monochloride or a magnesium monobromide cation, with sulfuryl fluoride.

---

This application is a division of application Ser. No. 343,938, filed Feb. 11, 1964, now U.S. Pat. 3,336,382.

The application relates to novel diarylsulfamyl fluoride and tetraarylsulfamide type compounds and their preparation.

The diarylsulfamyl fluoride compounds are useful as intermediates in the preparation of tetraarylsulfamide compounds, which are also the subject of this application. The diaryldiphenylsulfamide compounds are useful as intermediates in the preparation of the N,N-diarylbenzidines by disproportionation, which is the subject of the copending application of Cecil C. Chappelow, Jr. and Richard L. Elliott, Ser. No. 343,996, filed Feb. 10, 1964, now U.S. Pat. 3,264,352. Tetraarylsulfamides, in general, are useful as lubricant additives for improving wear characteristics, blowing agents for plastics, cross-linking agents and biocides, and because of their sharp decomposition temperatures, for $SO_2$ generation.

An object of this invention is to provide novel compounds of the diarylsulfamyl fluoride type. A further object is to provide novel compounds of the tetraarylsulfamide type. Still a further object is to provide an effective process for the preparation of the diarylsulfamyl fluoride and the tetraarylsulfamide compounds. Other objects and advantages of the invention will be apparent hereinafter.

One facet of our invention is based on the discovery that compounds of the diarylsulfamyl fluoride type can be prepared by reacting sulfuryl fluoride with metallic salts of diarylamines.

The process can be represented by the following generalized equation:

(1) 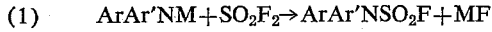 ArAr'NM+$SO_2F_2$→ArAr'NSO$_2$F+MF

The other facet of our invention is based on the discovery that compounds of the tetraarylsulfamide type can be prepared by one of three reactions illustrated by the following generalized equations:

(2) 2ArAr'NM+$SO_2F_2$→ArAr'NSO$_2$NAr'AR+2MF
(3) ArAr'NSO$_2$F+Ar''Ar'''NM→ 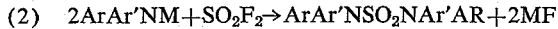
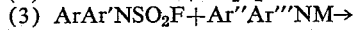 ArAr'NSO$_2$NAr'Ar'''+MF
(4) 2ArAr'NSO$_2$F+2MNH$_2$→ 
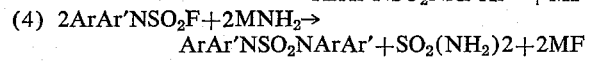 ArAr'NSO$_2$NArAr'+SO$_2$(NH$_2$)2+2MF The similarity of Equation 1 illustrating the preparation of diarylsulfamyl fluorides and Equation 2 illustrating the preparation of tetraarylsulfamides except for the molar proportion of the diarylamine salt will be explained hereinafter.

In Equations 1–4: Ar, Ar', Ar'', Ar''' can be the same or different aryl groups. The aryl groups can have 1 to 3 benzene rings; however, the preferred number of benzene rings is either 1 or 2, and they can be substituted with such substituents as alkyl, alkoxy, aryloxy, alkylthio, dialkylamino, and similar radicals non-reactive with the free metals, metal hydrides, metal amides or metal alkyls, which are used to prepare the required metal salts of diarylamines. It is preferred that the alkyl group of these substituents contain 1 to 10 carbon atoms. In Equation 1, M can be an alkali metal cation, for example, lithium, sodium, or potassium, or one of the cations, magnesium monochloride or magnesium monobromide. In Equations 2–4, M can be an alkali metal cation, e.g., lithium, sodium or potassium. The diarylamine salts can be prepared by known methods such as reacting the diarylamine with free metals, metal hydrides, metal amides, or metal alkyls.

The processes illustrated by Equations 1–4 can be conducted by admixing the reactants in a reaction vessel such as a glass-lined container optionally equipped with stirring, refluxing, and heating means. The salt of the diarylamine or the alkali metal amide are usually first suspended in a non-reactive liquid suspending medium, which also acts as a solvent, such as an ether or hydrocarbon and, more specifically, ethyl ether, toluene, or xylene. A melt of the reactants can be substituted for the suspending medium and solvent. Conducting the reaction in a liquid state or liquid medium enhances the reaction by providing effective surface contact between the reactants. Where one of the reactants in sulfuryl fluoride, which is a gas, it can be passed into intimate contact with the salt or amide from any point in the reaction vessel typically by bubbling the gas through the reaction medium. Where the reactant is a diarylsulfamyl fluoride, which is generally a solid, but may be a liquid, the reactant is merely introduced into the reaction medium and admixed with the other reactant.

The molar ratios of the reactants can be varied over a broad range. In the reaction illustrated by Equation 1, 0.75 to 1.25 mols of salt per mol of sulfuryl fluoride can be used, with 0.90 to 1.10 mols of salt per mol of sulfuryl fluoride being preferred. In the reaction illustrated by Equation 2, 1.50 to 2.50 mols of salt per mol of sulfuryl fluoride can be used, with 1.75 to 2.25 mols of salt per mol of sulfuryl fluoride being preferred. In the reaction exemplified by Equation 3, 0.75 to 1.50 mols of salt per mol of diarylsulfamyl fluoride can be admixed and preferably 0.90 to 1.25 mols of salt per mol of diarylsulfamyl fluoride is used. In the reaction illustrated by Equation 4, 0.75 to 1.50 mols of amide per mol of diarylsulfamyl fluoride can be used, with 0.90 to 1.25 mols of amide per mol of diarylsulfamyl fluoride being preferred.

The reactions can be conducted over a wide range of temperatures, which can range from about −70° to 200° C. A preferred temperature range is from about 0° to 150° C. The reaction time also covers a wide range from about ¼ to 80 hours and, usually, from 1 to 30 hours. Atmospheric pressure is preferable and most practical, but super-atmospheric pressures can be used. The atmosphere surrounding the reaction medium is preferably nitrogen but can be any inert gas.

As the reactions, which are usually exothermic, proceed a solution of the reactants and the product is formed. For best results, refluxing and stirring are used during the procedure. The reaction products can be separated from the solvent by evaporation, distillation, extraction, or other conventional means. In the case of solid products, recrystallization is suggested for purification.

Four different structural types of tetraarylsulfamides can be prepared.

Pure and mixed symmetrical tetraarylsulfamides of the following types:

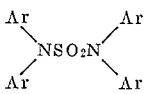

and

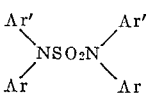

where Ar and Ar' are different aryl groups, can be prepared without isolation of the intermediate sulfamyl fluoride by conducting the process in one step as shown in Equation 2, supra. A high yield tetraarylsulfamide compound will be attained where there is a molar excess of diarylamine salt over the sulfuryl fluoride. If the diarylamine salt is present in an amount which does not exceed the molar amount of sulfuryl fluoride, a comparatively high yield of a diarylsulfamyl fluoride will be attained. As noted, Equations 1 and 2 are the same except that the diarylamine salt is present in greater amounts in Equation 2; however, as noted, the proportions do not have to be exactly the same as represented in these generalized equations. A molar excess of diarylamine salt can be used where the tetraarylsulfamide is the objective, and the equimolar quantity or deficiency of diarylamine salt can be used where a diarylsulfamyl fluoride is the objective.

Also, sulfamides of the above type can be prepared from diarylsulfamyl fluorides by reaction with an alkali metal amide. This reaction is shown by Equation 4.

Mixed symmetrical and unsymmetrical tetraarylsulfamides of the following types:

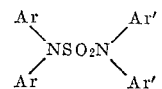

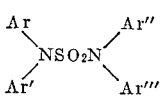

where Ar and Ar' are different, but Ar', and Ar'', and Ar''', can be the same or different, are prepared by conducting the process in two steps. The sulfamyl fluoride derivative of one diarylamine is prepared by the first step. Then, the resultant diarylsulfamyl fluoride is reacted with the salt of a different diarylamine as shown in Equation 3.

The following compounds are typical but nonlimiting examples of sulfamide products produced by the process of this invention: tetraphenylsulfamide . . . 1-(4-methylphenyl) - 1,3,3 - triphenylsulfamide . . . 1,3 - bis(2,4-dimethylphenyl) - 1,3 - diphenylsulfamide . . . 1,3 - bis(2-naphthyl) - 1,3 - diphenylsulfamide . . . 1,3 - bis(1-naphthyl) - 1,3 - bis(4-methoxyphenyl)sulfamide . . . 1,1,3,3 - tetrakis(4-methylphenyl)sulfamide . . . 1 - biphenylyl - 1 - phenyl - 3,3 - bis(4-methylphenyl)sulfamide . . . 1 - (4-phenoxyphenyl) - 1,3,3 - triphenylsulfamide.

In the following examples, parts and percentages are by weight. Examples I through IV and the examples shown in Table I are directed to the diarylsulfamyl fluoride compounds. Examples V through IX are directed to the tetraarylsulfamide compounds.

EXAMPLE I

Diphenylsulfamyl fluoride

To a reaction vessel, provided with means for heating, gas addition, and stirring, was added 110 parts of the magnesium bromide salt of diphenylamine and 200 parts of diethyl ether. Over a 5 hour period, 45 parts of sulfuryl fluoride were slowly bubbled into the stirred suspension of the magnesium bromide salt of diphenylamine while the temperature was maintained at 25° C. After the addition was complete, the reaction mixture was stirred for an additional 2 hours. The reaction mixture was filtered and the ether removed from the filtrate, which was evaporated to dryness. The residue was recrystallized from isopropyl alcohol. The resultant crude product was extracted with ether. The ethereal extracts were evaporated to dryness and the residue recrystallized from petroleum ether yielding 39 parts (39 percent yield) of a white crystalline product, M.P. 79–80° C.

*Analysis.*—Calcd. for $C_{12}H_{10}FNO_2S$ (percent): C, 57.4; H, 4.0; N, 5.6. Found (percent): C, 57.7; H, 4.2; N, 5.5.

EXAMPLE II

Diphenylsulfamyl fluoride

One-hundred-ninety-one parts of the sodium salt of diphenylamine and 400 parts of toluene were placed in a reaction flask fitted with means for heating, gas addition, refluxing and stirring. The mixture was heated to 90° C. with slow stirring and 100 parts of sulfuryl fluoride was slowly bubbled into the reaction mixture over a 3 hour period. After the addition, which was mildly exothermic was complete, the reaction mixture was refluxed at 142° C. for 1 hour. The reaction mixture was filtered and solvent removed from the filtrate by evaporation. The residue was taken up in isopropyl alcohol and decolorized with charcoal. The decolorized solution was concentrated and cooled several times to obtain 150 parts (a 60 percent yield) of white crystalline product, M.P. 77–79° C.

EXAMPLE III

N-(2-naphthyl)-N-phenylsulfamyl fluoride

A slurry of 45 parts of the lithium salt of N-(2-naphthyl)aniline in 400 parts of xylene were placed in a reaction flask equipped with a heater, thermometer, stirrer, reflux condenser, and a gas inlet tube. The contents were heated up to 120° C. and 25 parts of sulfuryl fluoride were bubbled into the vigorously stirred reaction mixture over a 6 hour period. The reaction mixture was cooled, filtered and evaporated to dryness yielding 52 parts of a brown crystalline residue. The crude product was taken up in isopropyl alcohol and treated with charcoal. The decolorized solution was concentrated and cooled to effect crystallizatiton. The product obtained in a 55 percent yield (33 parts) was a snow-white crystalline solid, M.P. 113–115° C. The infrared spectrum of this product contained strong absorption bands at 1,200 cm.$^{-1}$ and 1,410 cm.$^{-1}$ which are characteristic of diarylsulfamyl fluorides.

*Analysis.*—Calcd. for $C_{16}H_{12}FNO_2S$ (percent): C, 63.8; H, 4.0; N, 4.7; S, 10.6; mol. wt., 301. Found (percent): C, 63.7; H, 4.2; N, 5.0; S, 10.9; mol. wt., 309 (ebullioscopic in cyclohexane).

EXAMPLE IV

N-(4-methylphenyl)-phenylsulfamyl fluoride

To a vigorously stirred suspension of 48 parts of the lithium salt of N-(4-methylphenyl)aniline in 400 parts of boiling xylene, was added 35 parts of sulfuryl fluoride over a 4 hour addition period. The reactiton mixture was refluxed an additional hour before it was cooled and filtered. The filtrate was treated with charcoal and the resultant partially decolorized solution was evaporated to dryness. The dark-brown semicrystalline residue (60 parts) was taken up in isopropyl alcohol and treated with charcoal again. The alcoholic solution was evaporated to dryness, yielding a light brown oily residue (42 parts). The oily residue was taken up in petroleum ether and treated with charcoal again. Removal of the solvent gave 34 parts (a 51 percent yield) of the final product, a light brown oil, which on standing solidified to light-tan waxy solid, M.P. 44–47° C. The infrared spectrum of this material was very similar to the spectrum of diphenylsulfamyl fluoride except that it contained an additional strong band at 1,510 cm.$^{-1}$ which is probably due to presence of the C-4 methyl group.

Further examples are shown in Table I. These examples are variations of Examples I and III, supra.

TABLE I

| Reactants (moles) | | Reaction conditions (atmospheric pressure) | | | Product (yield) |
|---|---|---|---|---|---|
| | | Solvent (type, ml.) | Time (hrs.) | Temp. °C. | |
| SO$_2$F$_2$+(C$_6$H$_5$)$_2$NMgBr: | | | | | (C$_6$H$_5$)$_2$NSO$_2$F: |
| (0.100) | (0.100) | Ether, 100 | 2 | −70 | (ca. 10%) |
| (0.250) | (0.200) | Ether, 160 | 6 | 28 | (20.5%) |
| (0.400) | (0.400) | Ether, 300 | 22 | 28 | (39.0%) |
| (0.150) | (0.104) | (CH$_3$)$_2$, 30–200 | 19 | 28 | (29.0%) |
| SO$_2$F$_2$+(C$_6$H$_5$)$_2$NNA: | | | | | (C$_6$H$_5$)$_2$NSO$_2$F: |
| (0.050) | (0.100) | Toluene, 400 | 1 | 110 | (35.5%) |
| (0.400) | (0.400) | Xylene, 300 | 1 | 142 | (43.0%) |
| (1.00) | (1.00) | Xylene, 500 | 1 | 142 | (59.6%) |

EXAMPLE V

Tetraphenylsulfamide

A mixture of 19 parts of the sodium salt of diphenylamine, 25 parts of diphenylsulfamyl fluoride, and 150 parts of xylene was stirred and refluxed at 140° C. for 6 hours. The reaction mixture was cooled, filtered and the filtrate evaporated to dryness. The residue was recrystallized from isopropyl alcohol. The crude product was redissolved in isopropyl alcohol and treated with charcoal. The decolorized solution was concentrated and cooled to obtain 20 parts (a 50 percent yield) of a white crystalline product, M.P. 165–166° C.

*Analysis.*—Calcd. for C$_{24}$H$_{20}$N$_2$O$_2$S (percent): C, 72.0; H, 5.0; N, 7.0; S, 8.0. Found (percent): C, 72.1; H, 5.0; N, 6.9; S, 8.2.

EXAMPLE VI

Tetraphenylsulfamide

Into a reaction vessel provided with means for heating, refluxing, and stirring was added 50 parts of diphenylsulfamyl fluoride, 7.8 parts of sodium amide and 500 parts of xylene. The contents were stirred and refluxed for 5 hours. The reaction mixture was cooled, filtered, and evaporated to dryness. The residue was recrystallized from 95 percent alcohol yielding 20 parts of product, M.P. 165–166° C. A mixed melting point with a sample of tetraphenylsulfamide prepared in Example V was undepressed and the infrared spectrum of the product and the sample were identical.

EXAMPLE VII 1-(4-methylphenyl)-1,3,3-triphenylsulfamide

Into a reaction vessel equipped with a stirrer, thermometer and reflux condenser was added 15 parts of diphenylsulfamyl fluoride, 11.5 parts of the lithium salt of N-(4-methylphenyl) aniline and 300 parts of 2,2,5-trimethylhexane. The contents of the reaction vessel were stirred and held at reflux for a period of 5 hours. The reaction mixture was cooled, filtered and the filtrate evaporated to dryness. A dark brown semicrystalline residue (24 parts) was taken up in petroleum ether and decolorized with charcoal. Cooling of the decolorized solution yielded a crude product which was recrystallized from petroleum ether. The final product, 10 parts (a 40 percent yield), was a white crystalline solid M.P. 109–111° C. It had an infrared spectrum very similar to that of tetraphenylsulfamide.

*Analysis.*—Calcd. for C$_{25}$H$_{22}$N$_2$O$_2$S (percent): C, 72.4; H, 5.4; N, 6.8; S, 7.7. Found (percent): C, 72.1; H, 5.2; N, 6.8; S, 7.9.

EXAMPLE VIII 1,3-bis(2-naphthyl)-1,3-diphenylsulfamide

Nine parts of the lithium salt of N-(2-naphthyl) aniline, 12 parts of N-(2-naphthyl)-N-phenylsulfamyl fluoride and 200 parts of xylene were placed in a reaction vessel equipped with a heater, stirrer and reflux condenser. The contents were stirred and held at 135° C. for a period of 30 hours. The mixture was cooled, filtered and evaporated to dryness yielding a dark-brown, oily residue (20 parts). This residue was taken up in isopropyl alcohol and treatd with charcoal. The decolorized solution was concentrated and cooled to obtain a crude product. Recrystallization of this material from petroleum ether gave a 10 percent yield (2 parts) of product, a tan crystalline solid, M.P. 119–122° C. The infrared spectrum of the product contained strong absorption bands at 1,160 cm.$^{-1}$ and 1,355 cm.$^{-1}$ which are characteristic of tetraarylsulfamides.

*Analysis.*—Calcd. for C$_{32}$H$_{29}$N$_2$O$_2$S (percent): C, 76.8; H, 4.8; N, 5.6; S, 6.4. Found (percent): C, 76.8; H, 4.7; N, 5.7; S, 6.7.

EXAMPLE IX 1,3-bis(4-methylphenyl)-1,3-diphenylsulfamide

A mixture of 21 parts of the sodium salt of N-(4-methylphenyl) aniline, 27 parts of N-(4-methylphenyl)-N-phenylsulfamyl fluoride and 200 parts of xylene was held at 130° C. for 8 hours with vigorous stirring. The reaction mixture was filtered and the filtrate treated with charcoal. The solution was exaporated to dryness yielding 49 parts of a semi-crystalline residue which was dissolved in hexane and treated with charcoal again. The residue (36 parts) obtained by evaporation of the hexane was extracted with petroleum ether. The extracts were evaporated to dryness to obtain a light brown oil which solidified on cooling as a tan solid. This material was recrystallized from methylcyclohexane to obtain a 50 percent yield of the final product, a white crystalline solid, M.P. 99–101° C.

*Analysis.*—Calcd. for C$_{25}$H$_{24}$N$_2$O$_2$S (percent): C, 72.9; H, 5.7; N, 6.5; S, 7.5. Found (percent): C, 72.9; H, 5.6; N, 6.5; S, 7.8.

The tetraarylsulfamides of this invention are subject to decomposition at high temperatures yielding sulfur dioxide in relatively pure form and can be used as a source of this substance.

We claim:

1. A compound of the formula:

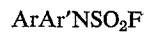

ArAr'NSO$_2$F wherein Ar and Ar' are selected from the group consisting of a substituted phenyl, a substituted naphthyl, an unsubstituted phenyl and an unsubstituted naphthyl radical, the substituent being independently selected from the group consisting of an alkyl, an alkylthio, a dialkylamino, an alkoxy, a phenyl, a phenylthio and a phenoxy radical, the alkyl portion of said substituent having from 1 to 10 carbon atoms.

2. A compound as set forth in claim 1 wherein said compound is diphenylsulfamyl fluoride.

3. A compound as set forth in claim 1 wherein said compound is N-(2-naphthyl)-N-phenylsulfamyl fluoride.

4. A compound as set forth in claim 1 wherein said compound is N - (4 - methylphenyl) - N - phenylsulfamyl fluoride.

5. A method for preparing a compound of the formula ArAr'NSO$_2$F wherein Ar and Ar' are selected from the group consisting of a substituted phenyl, a substituted naphthyl, an unsubstituted phenyl and an unsubstituted naphthyl radical, the substituent being independently selected from the group consisting of an alkyl, and alkylthio, a dialkylamino, an alkoxy, a phenyl, a phenylthio and a phenoxy radical, the alkyl portion of said substituent having from 1 to 10 carbon atoms, comprising reacting ArAr'NM, wherein Ar and Ar' are as defined above and M is an alkali metal or a magnesium monochloride or a magnesium monobromide cation, with sulfuryl fluoride in a liquid state or liquid medium, in a molar ratio of from 0.75 to 1.25:1 and at a temperature of from −70° to 200° C.

6. The method of claim 5 wherein M is a cation selected from the group consisting of magnesium monochloride and magnesium monobromide.

References Cited

Lovelace et al.: Aliphatic Fluorine Compounds (1958), p. 336.

LORRAINE A. WEINBERGER, Primary Examiner

E. J. GLEIMAN, Assistant Examiner